United States Patent
Rajkumar

(10) Patent No.: US 10,404,751 B2
(45) Date of Patent: Sep. 3, 2019

(54) METHOD FOR AUTOMATED SIEM CUSTOM CORRELATION RULE GENERATION THROUGH INTERACTIVE NETWORK VISUALIZATION

(71) Applicant: INTUIT INC., Mountain View, CA (US)

(72) Inventor: Vishal Rajkumar, Bangalore (IN)

(73) Assignee: INTUIT, INC., Mountain View, CA (US)

( * ) Notice: Subject to any disclaimer, the term of this patent is extended or adjusted under 35 U.S.C. 154(b) by 148 days.

(21) Appl. No.: 15/493,308

(22) Filed: Apr. 21, 2017

(65) Prior Publication Data

US 2018/0234457 A1 Aug. 16, 2018

(30) Foreign Application Priority Data

Feb. 15, 2017 (IN) .............................. 201731005413

(51) Int. Cl.
*H04L 29/06* (2006.01)
*H04L 12/24* (2006.01)

(52) U.S. Cl.
CPC .......... *H04L 63/20* (2013.01); *H04L 41/0631* (2013.01); *H04L 41/0654* (2013.01); *H04L 41/12* (2013.01); *H04L 41/22* (2013.01); *H04L 63/0263* (2013.01); *H04L 63/1408* (2013.01)

(58) Field of Classification Search
CPC ..... H04L 41/0876; H04L 41/12; H04L 41/22; H04L 41/0893; H04L 41/0889; H04L 41/0816; H04L 63/20; H04L 63/1408; H04L 63/0263; G06F 3/0481
See application file for complete search history.

(56) References Cited

U.S. PATENT DOCUMENTS

| | | | |
|---|---|---|---|
| 8,782,784 B1 * | 7/2014 | Bruskin | H04L 63/1425 713/2 |
| 8,874,550 B1 * | 10/2014 | Soubramanien | G06F 21/00 707/722 |
| 2015/0019537 A1 * | 1/2015 | Neels | G06F 16/338 707/722 |

(Continued)

FOREIGN PATENT DOCUMENTS

| | | | |
|---|---|---|---|
| EP | 2947849 A1 | 11/2015 | |
| WO | 2016036752 A2 | 3/2016 | |
| WO | WO-2016036752 A2 * | 3/2016 | ......... H04L 63/0209 |

OTHER PUBLICATIONS

International Search Report/ Written Opinion issued to PCT/2017/030191 dated Nov. 9, 2017.

*Primary Examiner* — Nelson Giddins
(74) *Attorney, Agent, or Firm* — Patterson + Sheridan, LLP

(57) ABSTRACT

The present disclosure provides a dynamic method for automated Security Information and Event Management (SIEM) custom correlation rule generation through the use of an interactive network visualization. The visualization is based on log data received from network endpoints and inputs received from a user, and is provided to the user for feedback before the SIEM custom correlation rules are automatically generated based on the visualization. The automatically generated SIEM custom correlation rules are then used to determine whether to trigger actions based on event data received from the network endpoints.

20 Claims, 4 Drawing Sheets

(56) References Cited

U.S. PATENT DOCUMENTS

| | | | |
|---|---|---|---|
| 2016/0156661 A1* | 6/2016 | Nagaratnam | G06F 21/57 726/1 |
| 2016/0300001 A1* | 10/2016 | Drumm | G05B 17/02 |
| 2017/0214718 A1* | 7/2017 | Couterier | G06F 16/162 |
| 2018/0027006 A1* | 1/2018 | Zimmermann | H04L 63/0245 726/11 |
| 2018/0212928 A1* | 7/2018 | Gerber | H04L 63/0209 |
| 2018/0246797 A1* | 8/2018 | Modi | G06F 11/3438 |
| 2018/0248902 A1* | 8/2018 | D Nil-Dumitrescu | G06N 3/02 |

* cited by examiner

METHOD FOR AUTOMATED SIEM CUSTOM CORRELATION RULE GENERATION THROUGH INTERACTIVE NETWORK VISUALIZATION

CROSS-REFERENCE TO RELATED APPLICATIONS

This application claims benefit of India Provisional Patent Application Serial No. 201731005413, entitled "METHOD FOR AUTOMATED SIEM CUSTOM CORRELATION RULE GENERATION THROUGH INTERACTIVE NETWORK VISUALIZATION," filed Feb. 15, 2017, which is assigned to the assignee hereof and the contents of which are hereby incorporated by reference.

BACKGROUND

Field

Embodiments presented herein generally relate to generating a Security Information and Event Management (SIEM) rule base. More specifically, techniques are disclosed for automated SIEM custom correlation rule generation through the use of an interactive network visualization.

Related Art

Security Information and Event Management (SIEM) solutions provide analysis of event data received from network hardware and software applications in order to provide alerts relating to issues which are detected. SIEM solutions are useful for such purposes as vulnerability assessment, network attack detection, network attack prediction, impact assessment, root cause analysis, and remediation/mitigation. The analysis performed by a SIEM solution generally involves applying rules from a rule base to the received event data so that appropriate correlations can be made between network events and entities involved in the events.

Rules in the rule base are usually generic and defined in advance, and each rule is manually enabled or disabled by a network administrator or security engineer. Creation of correlation rules which are specific to a particular network environment is a time consuming and complex process. For example, creation of a custom rule base may require a detailed analysis of doctrinal and tactical information sources, as well as information gleaned from knowledge elicitation sessions with subject matter experts. Accordingly, there is a need for a process which will expedite and simplify the creation of an environment-specific SIEM rule base.

SUMMARY

One embodiment of the present disclosure includes a method for automated Security Information and Event Management (SIEM) custom correlation rule generation. The method generally includes receiving log data from a plurality of endpoints in a network, receiving input data about the network from a user, and generating a preliminary visualization of the network based on the log data and the input data. The method further includes displaying the preliminary visualization to the user, receiving feedback from the user about the preliminary visualization (i.e. through interaction with the visualization), and generating, based on the preliminary visualization and the feedback, a finalized version of the visualization of the network. The method further includes automatically generating, based on the visualization, one or more SIEM custom correlation rules, receiving event data from the plurality of endpoints, and applying the one or more SIEM custom correlation rules to the event data in order to determine whether to trigger one or more actions.

Another embodiment provides a computer-readable storage medium having instructions, which, when executed on a processor, perform the method for automated Security Information and Event Management (SIEM) custom correlation rule generation as described above.

Still another embodiment of the present disclosure includes a processor and a memory storing a program which, when executed on the processor, performs the method for automated Security Information and Event Management (SIEM) custom correlation rule generation as described above.

DETAILED DESCRIPTION

Embodiments herein relate to automated Security Information and Event Management (SIEM) custom correlation rule generation through interactive network visualization. For example, a SIEM solution may receive data in the form of logs from a plurality of hardware and software network endpoints, such as routers, switches, servers, applications, firewalls, etc. Data may also be received in other forms. The SIEM solution may also, when it is first added to the network, receive additional information about the network from a user such as a network administrator or security engineer (e.g. in response to questions displayed in a user interface). The SIEM solution may then use all of this information to generate a preliminary visualization of the network, which may be presented to the user for approval or feedback. The preliminary visualization may, for example, comprise a graphical representation of the network environment, including representations of the various entities, relationships, zones, and connections which exist in the network (e.g. if the SIEM determines that hosts in a particular zone are expected to receive IP addresses only from a particular Dynamic Host Control Protocol (DHCP) server, this may be illustrated using arrows and text in the preliminary visualization). Once the preliminary visualization is approved by the user, with or without additional changes, a completed version of the visualization may be generated. This visualization may then be used to automatically generate a set of SIEM custom correlation rules which are specific to the network environment portrayed in the visualization.

Once a rule base has been automatically generated, processing may continue with the SIEM solution receiving event data from the plurality of hardware and software endpoints. The automatically generated SIEM custom correlation rules in the rule base may be applied to the event data to determine whether to take certain actions based on the events, such as triggering alerts or notifications relating to the various network endpoints.

In certain embodiments, the visualization may remain interactive as the SIEM solution runs. For example, the user may be able to make changes to the visualization through a graphical user interface as the SIEM solution continues to operate, and the updated visualization may then be used to automatically update the rule base. The user may be asked to approve an updated version of the visualization before it is finalized and used to automatically update the rule base. Once the rule base has been updated, the SIEM solution applies the updated SIEM custom correlation rules to the event data received from the various endpoints.

Figure 1:
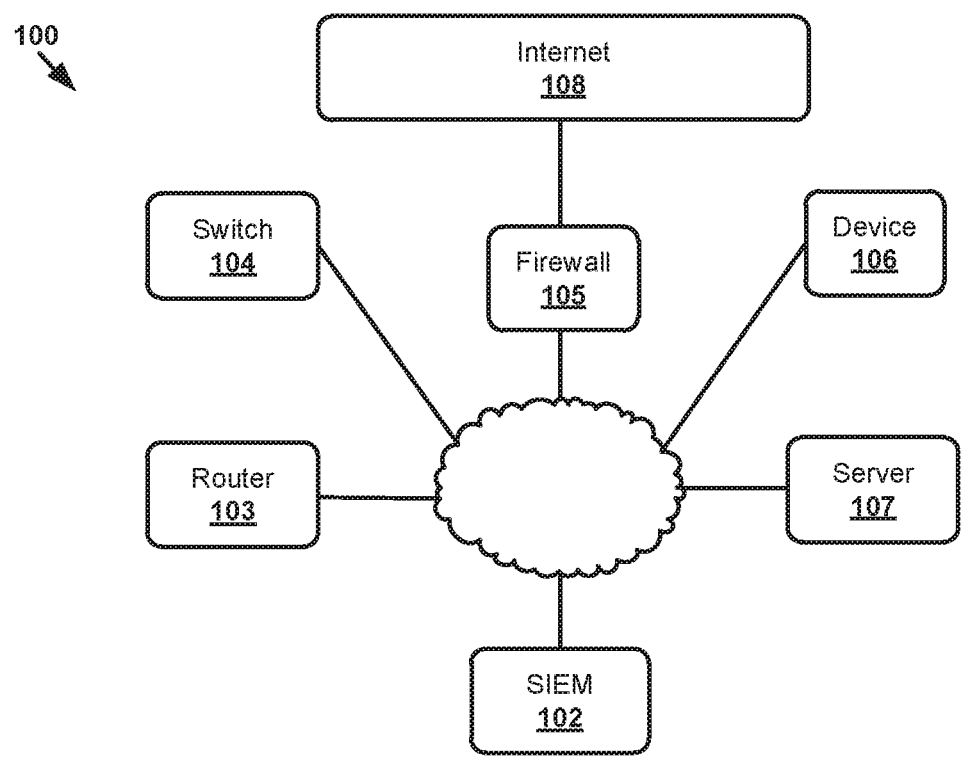
FIG. 1 illustrates an exemplary computing network environment wherein technology of the present disclosure can operate, according to one embodiment.

FIG. 1 illustrates a computing network environment 100 wherein technology of the present disclosure can operate, according to one embodiment. As shown, the environment 100 include a SIEM 102, as well as a plurality of network endpoints, including a router 103, a switch 104, a device 106, a server 108, and a firewall 105 by which the network is linked to the internet 108. The entities and connections depicted are merely exemplary, and the computing network environment 100 may include any number of hardware and software entities and interconnections between them. The network may be implemented as a physical or virtual network, and the entities depicted may be implemented as hardware or software entities. Each entity may also execute a plurality of software entities, such as applications, services, and virtual machines, which may also operate as endpoints in the network.

SIEM 102 may be implemented by a physical machine (e.g. a server computer, desktop computer, personal computer, tablet computer, mainframe, blade computer etc.) or virtual computing instance (e.g., virtual machine, container, data compute node) supported by a physical computing device, etc. SIEM 102 may be included as part of another entity, as a standalone entity (as shown), or may be distributed across multiple entities.

In certain embodiments, SIEM 102 receives logs from all endpoints in the network, the endpoints being exemplified by 103-107. The logs may, for example, include information about sessions, transactions, processes, activities, configurations, and data flow among the various hardware and software endpoints. The information included in the logs may be analyzed by SIEM 102 in order to gather data about the network environment.

SIEM 102 may also receive information about the network from a user, such as a network administrator or security engineer. In some embodiments, the information may be received in response to specific prompts from SIEM 102 in a graphical user interface, and may be entered by the user through the use of an input device which allows for interaction with the graphical user interface. SIEM 102 may, for example, ask the user a particular set of questions about the network, and the user may respond to the questions through the graphical user interface. In certain embodiments, this may occur when SIEM 102 is first added to the network, and may be part of an installation process for SIEM 102.

Using the information received from the logs and the user input, SIEM 102 may then generate a preliminary visualization of the network. The preliminary visualization may comprise a graphical representation of the network environment, including representations of the various entities, relationships, zones, and connections which exist in the network. The preliminary visualization may then be presented to the user in the graphical user interface, which may be shown on a display device associated with SIEM 102. SIEM 102 may then request user approval of the preliminary visualization. In some embodiments, the user may be allowed to make changes to the preliminary visualization through interacting with the graphical user interface before providing approval.

Once the preliminary visualization has been approved by the user, SIEM 102 may generate a completed version of the visualization. SIEM 102 may then use the visualization to automatically generate a set of custom correlation rules which are specific to the network environment portrayed by the visualization. The custom correlation rules may, for example, include rules which define relationships, dependencies, connections, and conclusions which can be drawn based on the occurrence of events and meta-events at various network endpoints.

SIEM 102 may then receive event data from the plurality of network endpoints, the endpoints being exemplified by 103-107. The event data may, for example, relate to security events or general network events (such as, for example, failures) which occur at the various endpoints. The event data may be analyzed by SIEM 102 according to the automatically generated custom correlation rules. For example, one or more events may be analyzed by determining whether they, alone or in combination, meet one or more conditions specified in the custom correlation rules. If a custom correlation rule is implicated by a particular event or combination of events, SIEM 102 may take a particular action defined by the rule. For example, SIEM 102 may trigger an alert to be displayed in the graphical user interface or transmitted to certain endpoints based on the rule.

During the operation of SIEM 102 as described herein, the user may be enabled to continue interacting with the visualization through the graphical user interface. For example, the user may be enabled to make changes to the visualization while SIEM 102 continues to process event data and trigger actions based on the custom correlation rules. In some embodiments, SIEM 102 may automatically update the custom correlation rules every time the user makes a change to the visualization. The user may be required to approve an updated version of the visualization before the updated visualization is used to automatically update the custom correlation rules. Once the rules have been updated, SIEM 102 may continue to process event data according to the updated rules.

Figure 2:
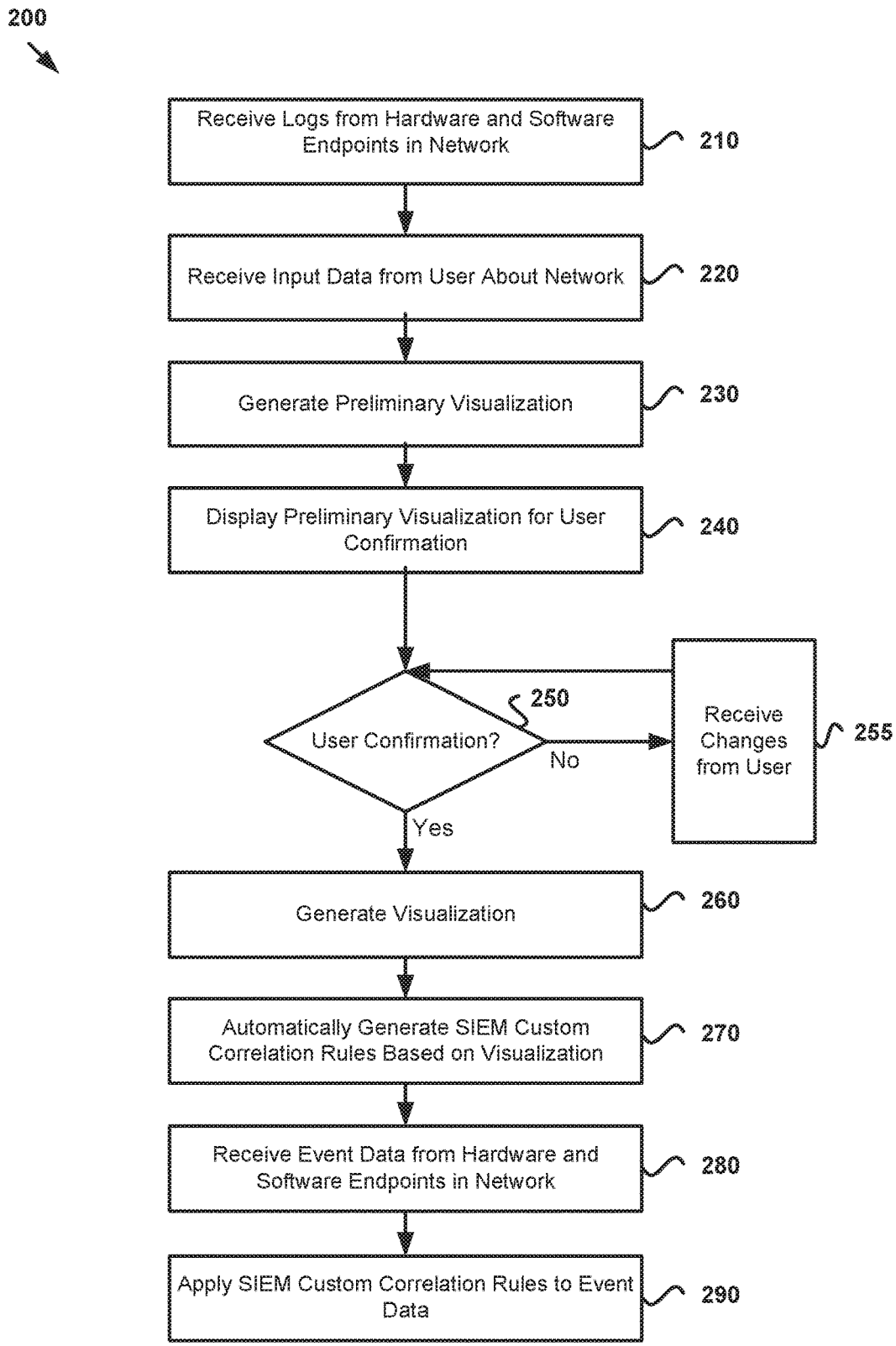
FIG. 2 illustrates steps involved in one embodiment of the method for automated Security Information and Event Management (SIEM) custom correlation rule generation through interactive network visualization.

FIG. 2 illustrates steps involved in one embodiment of the method for automated Security Information and Event Management (SIEM) custom correlation rule generation through interactive network visualization. These steps may be performed in a network environment such as that depicted in FIG. 1, and may, for example, be implemented by SIEM 102 in FIG. 1.

At 210, SIEM 102 receives logs from the various hardware and software endpoints in the network. For example, all hardware and software endpoints may be configured to send logs to SIEM 102. Logs may, for example, include information about sessions, transactions, processes, activities, configurations, and data flow among the various hardware and software endpoints. Information in a log from a particular endpoint may include, for example, source IP addresses and source ports of incoming traffic at the endpoint, destination IP addresses and destination ports of outgoing traffic from the endpoint, and information about the identities and activities of applications executing on the endpoint or on other connected endpoints.

At 220, SIEM 102 receives input data from a user about the network. This input data may be provided by the user through a graphical user interface associated with SIEM 102. In some embodiments, the user may be presented with a series of questions about the network at the time SIEM 102 is first added to the network, and the input data may be received in response to the questions. The input data received from the user may include, for example, information about network zones, which endpoints are included in particular network zones, whether or not incoming or outbound traffic is expected from particular zones or endpoints, IP addresses belonging to suspicious entities, etc. For example, the user may be presented with a series of questions such as: "Is the host with IP address 10.1.1.5 and hostname mycorpadserver your active directory server?"; "What is the IP address range assigned to the DMZ zone?"; "Is SSH login to your webservers expected from the internal zone?"; "What is the IP address of your core switches?"; "Is the log source with IP address 172.16.10.1 an intrusion detection system?"; "Is 1.2 GB of outbound traffic expected from hosts in your internal network per host per day?"; "Is IRC traffic allowed from your network to the internet?"; "Is access to online gaming websites allowed?". In some embodiments, the user may respond to each question with an indication of yes or no, and in other embodiments the user may be enabled to provide additional information.

At 230, SIEM 102 generates a preliminary visualization of the network based on at least a portion of the information from the logs and the user inputs. The preliminary visualization may comprise, for example, a graphical representation of the network as described by the information. Endpoints, zones, connections, relationships, and various other network entities may be depicted based on the logs and the user inputs. The preliminary visualization may provide a comprehensive picture of the network based on all of the relevant information available at this point.

At 240, the preliminary visualization is presented to the user for approval. The preliminary visualization may be displayed in the graphical user interface associated with SIEM 102, and the user may be prompted for approval.

At 250, SIEM 102 determines based on the user's response whether or not the preliminary visualization has been approved. If the user has not yet granted approval, at 255 the user is allowed to make changes to the preliminary visualization. In some embodiments, the graphical user interface associated with SIEM 102 may allow the user to directly interact with the visualization in order to modify the various items depicted. For example, the user may be able to drag-and-drop entities, add or remove entities, rename entities, and otherwise modify aspects of the preliminary visualization. Once the user is satisfied with the preliminary visualization, the user may approve the preliminary visualization, and processing continues at 260.

At 260, the user having approved the preliminary visualization, SIEM 102 generates a visualization of the network based on the preliminary visualization. The visualization may, for example, be generated by finalizing the preliminary visualization as approved by the user. As described in more detail later, the user may be allowed to continue interacting with and changing the visualization through the graphical user interface as processing continues.

At 270, SIEM 102 automatically generates a set of SIEM custom correlation rules based on the visualization. This set of rules may form a rule base which is used on an ongoing basis to evaluate event data in the network. For example, if the visualization indicates that outbound traffic is not expected from a certain zone, SIEM 102 may automatically generate a custom correlation rule which specifies that an alert is to be generated if an event indicates outbound traffic was detected from this certain zone. As another example, if the visualization indicates that a particular endpoint is secure and can only be accessed by an administrator, SIEM 102 may automatically generate a custom correlation rule which specifies that an alert is to be generated if an event indicates that a non-administrator attempted to access this particular endpoint. As yet another example, if the visualization indicates that a certain IP address belongs to a suspicious entity, SIEM 102 may generate a custom correlation rule which indicates that an alert should be provided to the administrator if an event indicates that traffic was received from this suspicious IP address at an endpoint within a secure zone.

At 280, SIEM 102 receives event data from the various hardware and software endpoints in the network. The event data may be provided in the form of logs or other messages generated by the endpoints as events occur. An event may, for example, comprise incoming or outgoing traffic at an endpoint, a new endpoint joining the network, an endpoint failure, a login attempt, web access information, etc. SIEM 102 may monitor for event data, and may collect the data as it is generated.

At 290, SIEM 102 applies the custom correlation rules in the rule base to the received event data. This may, for example, involve comparing conditions identified in the rules to the event data in order to determine whether a rule condition has been met by a particular event or combination of events. For example, if a rule specifies that an alert should be generated if outbound traffic is detected from a particular zone, and an event indicates that outbound traffic was detected from the particular zone, then the rule condition has been satisfied and SIEM 102 generates an alert as prescribed by the rule. The alert may, for instance, be displayed in the graphical user interface and/or sent to relevant endpoints within the particular zone. A network administrator or security engineer may thereby be enabled to take corrective action based on the alert, and consequently prevent any additional security risks.

Figure 3:
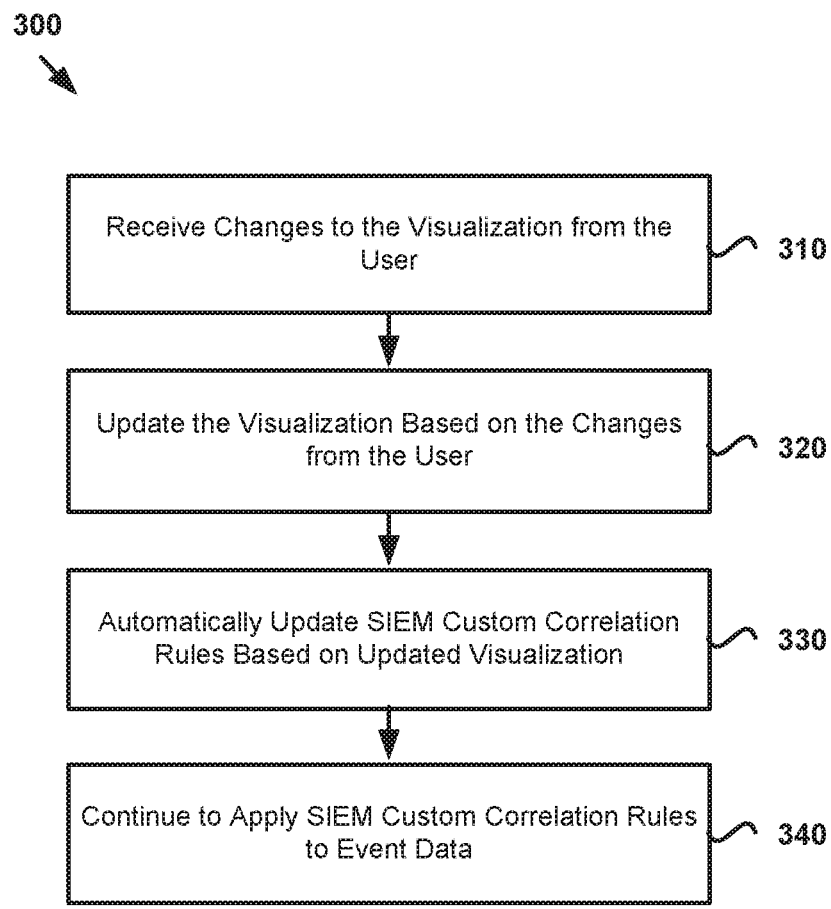
FIG. 3 illustrates a series of processes for allowing a user to update the interactive network visualization, and to cause the SIEM custom correlation rules to be automatically updated accordingly.

FIG. 3 illustrates a series of processes for allowing a user to update the interactive network visualization, and to cause the SIEM custom correlation rules to be automatically updated accordingly. The processes may be implemented by SIEM 102 in the network depicted in FIG. 1.

At 310, SIEM 102 receives changes to the visualization from the user. The changes may be provided by the user through interaction with the visualization in the graphical user interface. The user may be allowed to continually update the visualization as the SIEM solution runs. For example, the user may be able to drag-and-drop entities, add or remove entities, rename entities, and otherwise modify aspects of the visualization through the graphical user interface. In some embodiments, SIEM 102 waits to process changes until the user approves an updated version of the visualization.

At 320, SIEM 102 generates an updated visualization based on the changes provided by the user. The updated visualization may be generated by finalizing the changes made by the user to the visualization through the graphical user interface. SIEM 102 then continues to operate based on the updated visualization. The updated visualization may be displayed to the user in the graphical user interface associated with SIEM 102.

At 330, SIEM 102 automatically updates the custom correlation rules based on the updated visualization. If a change has been made to an entity which is involved in a rule, the updated rule reflects this change. For example, if the updated visualization indicates that a particular secure endpoint which was previously only accessible to administrators is now accessible to other entities, any rules based on this security level must be updated to reflect this change. New custom correlation rules may also be added to the rule base as a result of the updated visualization. For example, if the updated visualization indicates that a new zone has been added to the network, SIEM 102 may need to generate new rules associated with this new zone. Similarly, some custom correlation rules may be removed as a result of the updated visualization.

At 340, SIEM 102 continues to apply the updated custom correlation rules to event data received from hardware and software endpoints in the network. Processing of event data continues as described above, and SIEM 102 continues to adapt the rule base as the user makes changes to the visualization.

Figure 4:
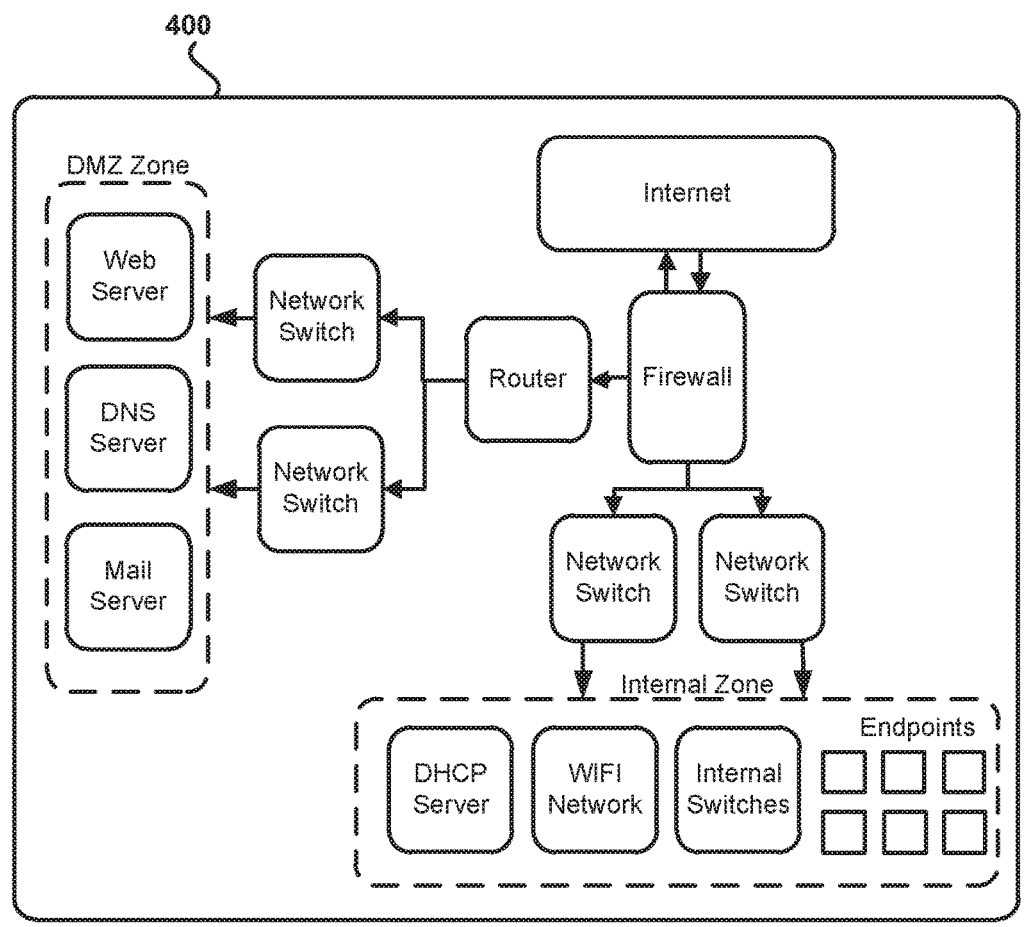
FIG. 4 illustrates an exemplary network visualization produced by some embodiments of the method of the present disclosure.

FIG. 4 illustrates an exemplary network visualization produced by some embodiments of the method of the present disclosure. As shown, the visualization may include graphical representations of the various entities and zones in the network, including representations of whether incoming and outgoing traffic is expected. The visualization 400 shown is only an example, and other forms of information and graphical representations may be included in the visualization. Visualization 400 may be generated based on the information gathered by SIEM 102 from logs and user inputs, and may be displayed in a graphical user interface associated with SIEM 102. In some embodiments, SIEM 102 allows a user to interact with visualization 400 through drag-and-drop and other forms of data entry using the graphical user interface. The user may be able to, for example, modify, add, remove, and rename items in visualization 400. Visualization 400 is then used to automatically generate or update the SIEM custom correlation rules.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for automated Security Information and Event Management (STEM) custom correlation rule generation, comprising:
   receiving log data from a plurality of endpoints in a network;
   receiving input data about the network from a user by:
      providing one or more questions to the user as part of an installation process for a SIEM system, wherein the one or more questions relate to one or more of:
         a network zone;
         an endpoint in the network; or
         an address; and
      receiving the input data from the user in response to the one or more questions;
   generating a preliminary visualization of the network based on the log data and the input data;
   displaying the preliminary visualization to the user;
   receiving drag-and-drop input from the user modifying one or more entities in the preliminary visualization;
   generating, based on the preliminary visualization and the drag-and-drop input, a visualization of the network;
   automatically generating, based on the visualization, one or more SIEM custom correlation rules;
   receiving event data from the plurality of endpoints; and
   applying the one or more SIEM custom correlation rules to the event data in order to determine whether to trigger one or more actions.

2. The method of claim 1, further comprising:
   receiving changes to the visualization from the user;
   generating an updated visualization based on the changes; and
   automatically updating the one or more SIEM custom correlation rules based on the updated visualization.

3. The method of claim 2, wherein the drag-and-drop input and the changes are provided by the user through a graphical user interface.

4. The method of claim 1, wherein the input data comprises one or more of:
an IP address of a network device;
network zone information; and
network host information.

5. The method of claim 1, wherein the log data from an endpoint of the plurality of endpoints comprises one or more of:
a source IP address of incoming traffic at the endpoint;
a destination IP address of outgoing traffic from the endpoint;
a source port of incoming traffic at the endpoint;
a destination port of outgoing traffic from the endpoint; and
identifying information of one or more applications executing on an endpoint of the plurality of endpoints.

6. The method of claim 1, wherein the input data comprises an indication that an IP address belongs to a suspicious entity.

7. The method of claim 1, wherein the one or more actions comprise generating at least one of:
an alert; and
a notification.

8. A system comprising:
one or more processors; and
memory storing one or more applications that, when executed on the one or more processors, perform a method for automated Security Information and Event Management (STEM) custom correlation rule generation, comprising:
receiving log data from a plurality of endpoints in a network;
receiving input data about the network from a user by:
providing one or more questions to the user as part of an installation process for a SIEM system, wherein the one or more questions relate to one or more of:
a network zone;
an endpoint in the network; or
an address; and
receiving the input data from the user in response to the one or more questions;
generating a preliminary visualization of the network based on the log data and the input data;
displaying the preliminary visualization to the user;
receiving drag-and-drop input from the user modifying one or more entities in the preliminary visualization;
generating, based on the preliminary visualization and the drag-and-drop input, a visualization of the network;
automatically generating, based on the visualization, one or more STEM custom correlation rules;
receiving event data from the plurality of endpoints; and
applying the one or more SIEM custom correlation rules to the event data in order to determine whether to trigger one or more actions.

9. The system of claim 8, wherein the method further comprises:
receiving changes to the visualization from the user;
generating an updated visualization based on the changes; and
automatically updating the one or more SIEM custom correlation rules based on the updated visualization.

10. The system of claim 9, wherein the drag-and-drop input and the changes are provided by the user through a graphical user interface.

11. The system of claim 8, wherein the input data comprises one or more of:
an IP address of a network device;
network zone information; and
network host information.

12. The system of claim 8, wherein the log data from an endpoint of the plurality of endpoints comprises one or more of:
a source IP address of incoming traffic at the endpoint;
a destination IP address of outgoing traffic from the endpoint;
a source port of incoming traffic at the endpoint;
a destination port of outgoing traffic from the endpoint; and
identifying information of one or more applications executing on an endpoint of the plurality of endpoints.

13. The system of claim 8, wherein the input data comprises an indication that an IP address belongs to a suspicious entity.

14. The system of claim 8, wherein the one or more actions comprise generating at least one of:
an alert; and
a notification.

15. A non-transitory computer-readable storage medium containing instructions that, when executed by one or more processors, perform a method for automated Security Information and Event Management (STEM) custom correlation rule generation, comprising:
receiving log data from a plurality of endpoints in a network;
receiving input data about the network from a user by:
providing one or more questions to the user as part of an installation process for a SIEM system, wherein the one or more questions relate to one or more of:
a network zone;
an endpoint in the network; or
an address; and
receiving the input data from the user in response to the one or more questions;
generating a preliminary visualization of the network based on the log data and the input data;
displaying the preliminary visualization to the user;
receiving drag-and-drop input from the user modifying one or more entities in the preliminary visualization;
generating, based on the preliminary visualization and the drag-and-drop input, a visualization of the network;
automatically generating, based on the visualization, one or more STEM custom correlation rules;
receiving event data from the plurality of endpoints; and
applying the one or more SIEM custom correlation rules to the event data in order to determine whether to trigger one or more actions.

16. The non-transitory computer-readable storage medium of claim 15, wherein the method further comprises:
receiving changes to the visualization from the user;
generating an updated visualization based on the changes; and
automatically updating the one or more SIEM custom correlation rules based on the updated visualization.

17. The non-transitory computer-readable storage medium of claim 16, wherein the drag-and-drop input and the changes are provided by the user through a graphical user interface.

18. The non-transitory computer-readable storage medium of claim 15, wherein the input data comprises one or more of:
   an IP address of a network device;
   network zone information; and
   network host information.

19. The non-transitory computer-readable storage medium of claim 15, wherein the log data from an endpoint of the plurality of endpoints comprises one or more of:
   a source IP address of incoming traffic at the endpoint;
   a destination IP address of outgoing traffic from the endpoint;
   a source port of incoming traffic at the endpoint;
   a destination port of outgoing traffic from the endpoint; and
   identifying information of one or more applications executing on an endpoint of the plurality of endpoints.

20. The non-transitory computer-readable storage medium of claim 15, wherein the input data comprises an indication that an IP address belongs to a suspicious entity.

* * * * *